United States Patent [19]

Lazarus

[11] 4,218,656
[45] Aug. 19, 1980

[54] ARRANGEMENT FOR THE REMOTE TRANSMISSION OF INFORMATION FOR THE REMOTE GUIDANCE OF VEHICLES WHICH ARE SUBJECT TO SEVERE ACCELERATION

[75] Inventor: Michel Lazarus, Paris, France
[73] Assignee: Thomson-CSF, Paris, France
[21] Appl. No.: 887,417
[22] Filed: Mar. 15, 1978
[30] Foreign Application Priority Data
  Mar. 25, 1977 [FR] France .................. 77 08997
[51] Int. Cl.² ............................................. H04B 7/00
[52] U.S. Cl. ....................... 455/59; 244/3.11; 329/203
[58] Field of Search .............. 343/225, 226, 228, 769; 340/171 R; 325/37, 64, 55, 59, 61, 4, 51; 329/203, 204, 205, 206; 244/3.11; 179/15 BP

[56] References Cited
  U.S. PATENT DOCUMENTS

| 3,041,450 | 6/1962 | Parker | 325/51 |
|---|---|---|---|
| 3,267,340 | 8/1966 | Regeffe | 329/204 |
| 3,366,961 | 1/1968 | Goldstein | 325/37 |
| 3,394,373 | 7/1968 | Makrancy | 343/769 |
| 3,530,472 | 9/1970 | Fukata et al. | 343/228 |

*Primary Examiner*—John H. Wolff
*Assistant Examiner*—Joseph A. Popek
*Attorney, Agent, or Firm*—Cushman, Darby & Cushman

[57] ABSTRACT

An arrangement for the remote transmission of information for the remote guidance of vehicles subject to severe acceleration. The arrangement is formed by a transmitter outside the vehicle and by a receiver on board of the vehicle. The transmitter is provided with a first source enabling a first signal of predetermined frequency to be generated and with a second source enabling a second signal of a different frequency to be generated. The receiver is provided with a mixing device consisting of a microwave diode biased in its non linear conduction zone in operation, the mixing device enabling a signal to be generated whose frequency is equal to the difference between the different frequencies of the first and second signal. A device for processing the signal whose frequency is equal to the frequency difference between the first and second signal is connected to the mixing device.

16 Claims, 6 Drawing Figures

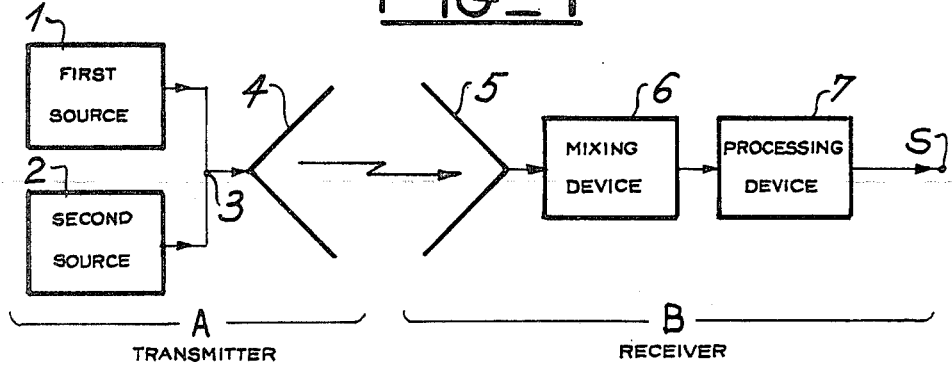
Fig_1
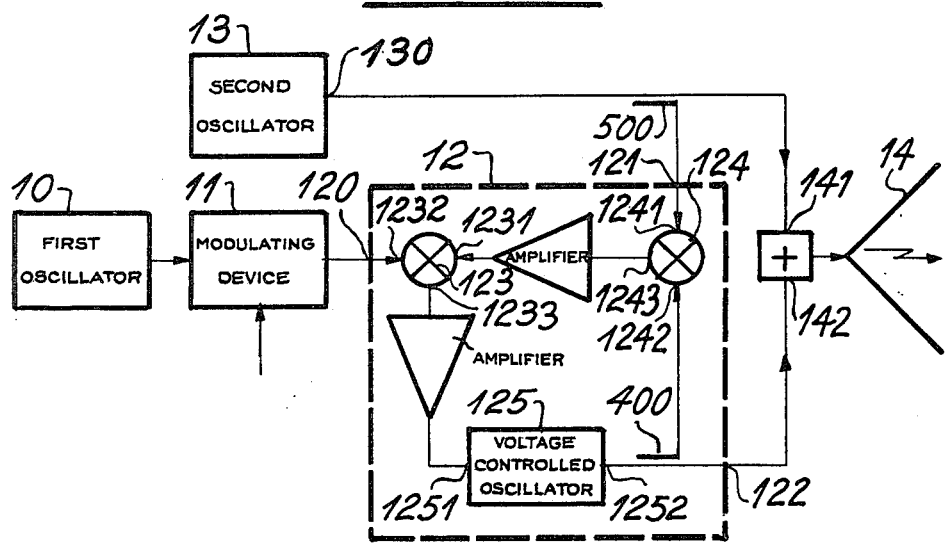
Fig_2
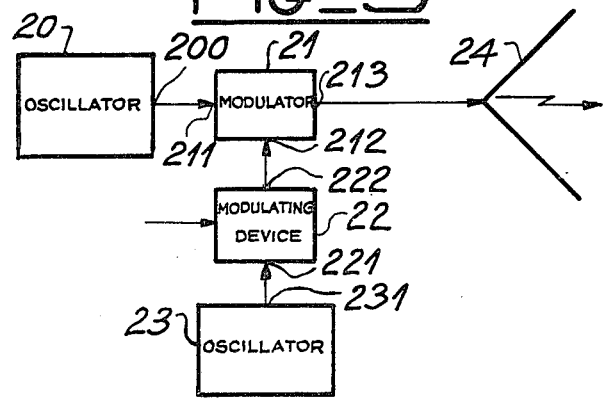
Fig_3

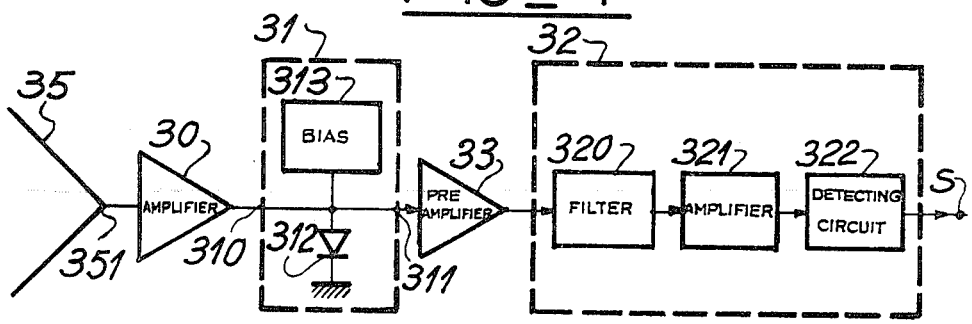
Fig_4
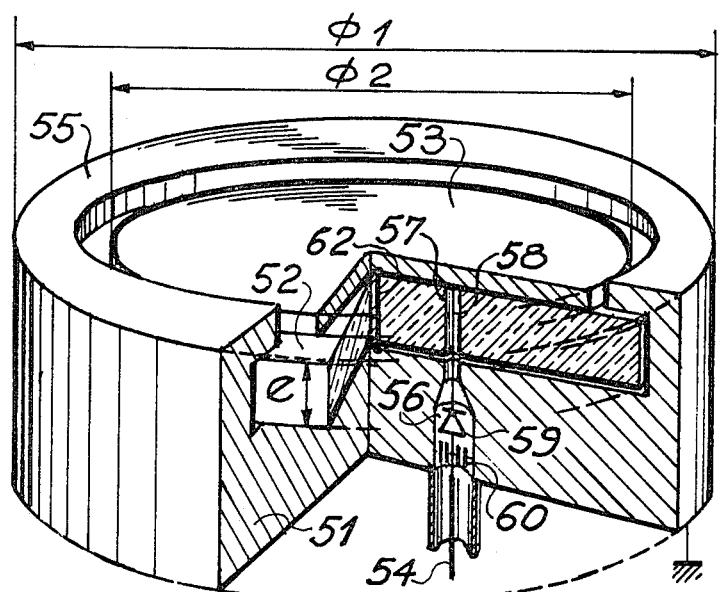
Fig_5
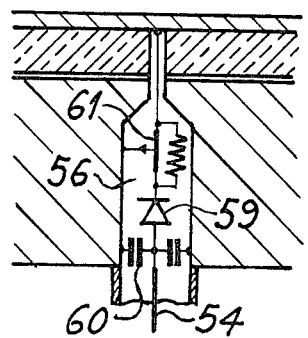
Fig_6

ARRANGEMENT FOR THE REMOTE TRANSMISSION OF INFORMATION FOR THE REMOTE GUIDANCE OF VEHICLES WHICH ARE SUBJECT TO SEVERE ACCELERATION

The present invention relates to an arrangement for the remote transmission of information, particularly for systems for the remote guidance of vehicles.

Present day remote transmission arrangements which enable information to be transmitted to a vehicle moving at high speed which is subject to severe acceleration may be divided into two categories. In a first category are those arrangements which comprise a transmitter and a direct-reception receiver attached to the vehicle which the information is transmitted, the transmitter generating a wave which is subject to all or nothing modulation to produce a coding representing the information to be transmitted to the vehicle. In a second category are those arrangements which similarly comprise a transmitter and a heterodyne receiver, the transmitter generating an amplitude, phase or frequency modulated wave, the modulation signal in each case representing the transmitted information.

Arrangements of the two foregoing kinds have, respectively, the disadvantages that they lack selectivity, have a high noise factor, are highly sensitive to jamming and interference, and that the level of the detected signal is attenuated by a factor proportional to the fourth power of the distance between the transmitter and receiver, in the case of arrangements in the first category, and the disadvantages that they are sensitive to the Doppler effect, that the local oscillator in the heterodyne receiver is sensitive to acceleration and vibration, and that the oscillator circuits are complicated by the addition of frequency controlling loops, in the case of arrangements in the second category.

One object of the present invention is to provide an arrangement for the remote transmission of information which is virtually insensitive to the Doppler effect and to acceleration and vibration.

Another object of the present invention is to provide an arrangement for the remote transmission of information whose sensitivity to jamming and interference is low and which has a low noise factor.

Another object of the present invention is to provide an arrangement for the remote transmission of information in which the receiver on board the vehicle to be supplied with information is small in size and highly reliable, as well as being inexpensive to produce, because of its simple construction.

The arrangement according to the invention for the remote transmission of information comprises means for transmitting information-carrying electromagnetic signals and means for receiving the said signals, the said transmitting means further including a first source which enables a first electromagnetic signal of a predetermined frequency F1 to be generated, and a second source which enables a second electromagnetic signal of a predetermined frequency F2, different from F1, to be generated, the said receiving means including a mixing device which enables an electromagnetic signal to be generated whose frequency F3 is equal to the difference between the frequencies of the said first and second electromagnetic signal, and means for processing the electromagnetic signal of frequency F3 connected to the mixing device.

Such arrangements may be used in particular for the remote guidance of vehicles moving at high speed which are subject to very severe acceleration, such as aircraft or guided missiles, and for the transmission of information to such vehicles.

Other features of the invention will be apparent from the following description and the accompanying drawings, in which:

FIG. 1 is a general diagram of an arrangement for the remote transmission of information on which the part marked A represents the means for transmitting electromagnetic signals and the part marked B is attached to the vehicle and represents the means for receiving these signals.

FIG. 2 shows a particular embodiment of the transmitting means indicated in FIG. 1, FIG. 3 shows another particular embodiment of the transmitting means indicated in FIG. 1, FIG. 4 shows a particular embodiment of the receiving means indicated in FIG. 1, FIGS. 5 and 6 show a particular embodiment of the antenna of the receiving means.

In the drawings the various items are not shown in their correct relative size and proportions to assist in overall comprehension.

In FIG. 1, the arrangement for the remote transmission of information to which the invention relates comprises means A for transmitting electromagnetic information-carrying signals, and means B for receiving these signal, i.e. a receiver. The transmitting means includes a first source 1 which enables a first electromagnetic signal of a predetermined frequency F1 to be generated in operation, and a second source 2 which enables a second electromagnetic signal of frequency F2 to be generated in operation. The two sources 1 and 2 are connected to a transmitting antenna 4. At least one of the two signals of frequencies F1 and F2 carries the information to be transmitted in the form of amplitude, phase or frequency modulation, the other signal being, for the receiver, a frequency translation signal. The receiving means comprise a receiving antenna 5 which is connected to a mixing device 6 which enables an electromagnetic signal to be generated whose frequency F3 is equal to the difference between the frequencies of the first and second electromagnetic signals F1 and F2. Means 7 for processing the electromagnetic signal of frequency F3 are connected to the mixing device 6. In operation, the electromagnetic signals of frequencies F1 and F2 are transmitted simultaneously from the transmitting means A and they are mixed and detected in the receiving means B attached to the vehicle. The information is supplied from the output S of the means 7 for processing the signal. In particular, the transmission of the electromagnetic signals F1 and F2 from one and the same point in relation to the vehicle to be supplied with information makes it possible to achieve insensitivity to the Doppler effect which arises from the relative speed of the vehicle and the transmitting means, by virtue of the virtually identical shifts in the frequencies F1 and F2 which occur as the vehicle moves. The simplicity of the receiving means, which is due to fact that they do not include a local oscillator, makes it possible to prevent acceleration from having any effect on the reception of the information and enables the subject of the invention to be used on guided missiles subject to accelerations which may be as much as 5,000 times the acceleration imparted by gravity.

FIG. 2 shows a particular embodiment of the transmitting means A. In this Figure, the first and second sources are formed by a first oscillator 10 which supplies, in operation, a signal of frequency F2−F1, a phase loop 12, and a modulating device 11 which is connected between the oscillator 10 and the input 120 of the phase loop 12. A second oscillator 13 has a output 130 which supplies a signal of frequency F1 to an input 121 of the phase loop 12. The phase loop 12 has an output 122 which emits the signal of frequency F2. A transmitting antenna 14 has a first input 141 connected to the output terminal 130 of oscillator 13 and a second input 142 connected to the output terminal 122 of the phase loop 12. In operation, the transmitting antenna 14 is fed with the signals of frequency F1 and the signals of frequency F2. The phase loop 12 includes a phase detector 123 having a first and second input 1231 and 1232 respectively and an output 1233, a mixing circuit 124 which has a first and second input 1241 and 1242 respectively and an output 1243, and a voltage-controlled variable oscillator 125 having an input 1251 and an output 1252. The output 1252 of the oscillator 125 is connected to the input 1242 of the mixing circuit and to the output 122 of the phase loop 12 which supplies the signal of frequency F2. The connection between output 1252 of oscillator 125 and the input 1242 of mixer 124 takes place via a matched coupler 400. The connection between output 130 of oscillator 13 and the input 1241 of mixer 124 takes place via a matched coupler 500. In operation, the phase discriminator 123 supplies a control voltage to the voltage-controlled variable oscillator 125. Oscillator 125 emits a corresponding signal of frequency F2. The mixing circuit 124 supplies a signal of frequency F2−F1 to the phase discriminator 123. Amplifiers allow the gain of the system to be adjusted.

FIG. 3 shows another embodiment of the transmitting means A. In this embodiment, the first and second sources are formed by an oscillator 20 which has an output 200 which supplies a signal of frequency $F0=\frac{1}{2}(F2+F1)$, by a 0, $\pi$ modulator 21 which has a first input 211 connected to the output 200 of the oscillator 20, a second input 212 and an output 213. A modulating device 22 has an output 222 connected to the said second input 212 of the modulator 21 and an input 221. An oscillator 23 has an output 231 which in operation supplies a signal of frequency F2−F1/2. The output 231 of oscillator 23 is connected to the input 221 of the modulating device 22. A transmitting antenna 24 is connected to the output 213 of the 0, $\pi$ modulator 21. In operation, the 0, $\pi$ modulator supplies the transmitting antenna 24 with information-carrying signals whose frequencies F1 and F2 are respectively equal to $F1=F0-(F3/2)$ and $F2=F0+(F3/2)$.

FIG. 4 shows an embodiment of the receiving means B. In this Figure, the receiving means B includes a receiving antenna 35 having an output terminal 351 connected to the input terminal 310 of non-linear conduction means 31. From their output terminal 311, the non-linear conduction means emit a signal whose frequency F3 is equal to the difference between frequencies F2 and F1. The non-linear conduction means 31 has its output 311 connected to the input of circuits 32 for processing the signal of frequency F3. The non-linear conduction means are, for example formed by a microwave diode 312 which is connected in parallel with the output channel of the receiving antenna and by biassing means 313 which supply a voltage for biassing the diode into its zone of non-linear conduction.

In a preferred embodiment of the subject of the invention, the output 351 of the receiving antenna is connected to the non-linear conduction means via a high-frequency amplifier 30. This embodiment dispenses with the need to use high-power transmitting means to transmit information over long distances. In effect, using an amplifier 30 having a gain G expressed in decibels makes it possible to achieve an overall gain of 2G for the signal of frequency $F3=F2-F1$ as a result of the amplification of both the signals of frequencies F1 and F2, and makes it possible to remedy the attenuation in the useful received power which is proportional to the fourth power of the distance between the transmitting means A and the receiving means B.

The circuits 32 for processing the signal of frequency F3 comprise, in series, a filter 320 for the intermediate frequency F2−F1, an amplifier 321, and circuits 322 for detecting the modulation of the signal of frequecny F3. To obtain a better match between the filter 320 and the mixing circuits, which are formed by a diode, a preamplifier 33 provides a connection between output 311 of the non-linear conduction means and the input of filter 320, the pre-amplifier enabling the filter to be matched as far as the diode noise is concerned.

So that the arrangement as a whole shall, in particular, be insensitive to vibration and acceleration when the vehicle is liable to subject the receiving means to accelerations of the order of 5,000 times that imparted by gravity, the receiving antenna 35 is, for example, formed as shown in FIGS. 5 and 6. In FIG. 5, the receiving antenna has, in a dense, cylindrical metal body 51 which is connected to the reference voltage for the arrangement, a slab of dielectric material 52. The thickness e of the dielectric slab is of the order of a fraction of the wavelength of the received signals. The dielectric slab 52 is, for example, secured to the metal body 51 by retaining rim 55. The dielectric slab 52 has on its exposed face a conductive sheet 53. The conductive sheet 53 is, for example, produced in the form of a metal deposit using the techniques employed for printed circuits and is in the shape of a circle having a diameter $\phi_2$ of the order of approximately 15 mm which is equal to half the diameter $\phi_1$ of the metal body 51. This sheet 53 is connected to the reference voltage for the arrangement through the dielectric 52 by a conductor 62 which is connected near the centre of the sheet at a point where the radioelectrical field is zero. A co-axial output cable 54 enables the signals of frequency F3 to be transmitted. In FIG. 5, the metal body 51 and the slab of dielectric material 52 respectively contain orifices 56 and 57 which provide a passage for a conductor 58 which connects the metal sheet 53 to the non-linear conduction means, which are formed by a diode 59. The diode 59 is housed in orifice 56 and is directly connected to the biassing means by the centre core of the co-axial cable 54. Capacitors 60 enable the high-frequency signals to be decoupled from the reference voltage for the arrangement. In cases where a high-frequency amplifier 30 is used, as shown in FIG. 4, the amplifier is, for example, formed by a high-frequency amplifying transistor 61 which is inserted in the cavity 56 in the metal body 51 between the metal sheet 53 and the diode 56 the transistor having a high frequency input connected to the metal sheet. Transistor 61 is likewise biassed from the centre core of the coaxial cable 54 as shown in FIG. 6.

This embodiment of the subject of the invention enables a remote transmission arrangement to be obtained which has a highly reliable, low-cost receiver.

What is claimed is:

1. An arrangement for the remote transmission of information comprising means for transmitting information carrying electromagnetic signals and means for receiving said signals, wherein said means for transmitting includes:

first and second sources generating first and second signals having different frequencies F1 and F2 respectively, one of said first and second signals carrying said information to be transmitted and the other providing a frequency translation signal for said means for receiving, and wherein said means for receiving includes:

signal mix means for mixing said first and second signals to produce a third signal modulated with said information and having a frequency F3 equal to the difference between F1 and F2 wherein said signal mix means includes a receiving antenna having an output terminal and non-linear conduction means coupled to said output terminal, said non-linear conduction means including a microwave diode coupled in parallel with an output channel of said receiving antenna and means for biassing said microwave diode into its zone of non-linear conduction, said non-linear conduction means thereby supplying in operation said modulated signal having frequency F3; and a circuit for processing said signal of frequency F3 coupled to said signal mix means.

2. An arrangement as claimed in claim 1, wherein said receiving antenna comprises, in a dense cylindrical metal body:

a slab of dielectric material which has on its exposed face a conductive sheet, said metal body containing an orifice in which is housed said diode, said diode being connected to a high frequency amplifying transistor and to the central core of a coaxial cable, said high frequency amplifying transistor having a high frequency input connected to said conductive sheet.

3. An arrangement as claimed in claim 1, wherein said receiving antenna comprises in a dense cylindrical metal body a slab of dielectric material which has on its exposed face a conductive sheet, said metal body containing an orifice in which is housed said diode, said diode being connected to said biassing means and to said conductive sheet, and said conductive sheet being connected to a reference voltage through said dielectric slab by a conductor connected on the sheet at a point where the radio electrical field is zero.

4. An arrangement for the remote transmission of information comprising means for transmitting information carrying electromagnetic signals and means for receiving said signals, wherein said means for transmitting includes:

first and second sources generating first and second signals having different frequencies F1 and F2 respectively, one of said first and second signals carrying said information to be transmitted and the other providing a frequency translation signal for said means for receiving, said first and second sources together including a first oscillator supplying at its output in operation a signal of frequency F2−F1, a modulating device, a phase locked loop with first and second inputs, said modulating device being connected between the output of said first oscillator and the first input of said phase loop, said modulating device delivering, in operation, a modulated signal of frequency F2−F1 carrying the information to be transmitted, and a second oscillator with an output supplying a signal of frequency F1 to said second input of said phase loop, said phase loop having an output which supplies, in operation, a signal of frequency F2, said signals F1 and F2 being combined for transmission; and wherein said means for receiving includes: signal mix means for mixing said first and second signals to produce a third signal modulated with said information and having a frequency F3 equal to the difference between F1 and F2; and a circuit for processing said signal of frequency F3 coupled to said signal mix means.

5. An arrangement as claimed in claim 4, wherein said phase loop comprises:

a phase detector having a first and second input and an output, a mixing circuit having a first and second input and an output and a voltage controlled variable oscillator having an input and an output, said output of the said voltage controlled variable oscillator being connected to said second input of said mixing circuit and to the output of said phase loop which supplies in operation a signal of frequency F2, said first input of said mixing circuit being connected to the second input of said phase loop and receiving said signal of frequency F1, said output of said mixing device being connected to said first input of the said phase detector and said second input and output of said phase detector being respectively connected to said first input of said phase loop and to the input of said voltage controlled variable oscillator.

6. An arrangement as claimed in claim 4, wherein said circuit for processing said signal of frequency F3 comprises in series:

a filter for an intermediate frequency F2−F1,
an amplifier and circuits for detecting the modulation of the signal of frequency F3.

7. An arrangment for the remote transmission of information comprising means for transmitting information carrying electromagnetic signals and means for receiving said signals, wherein said means for transmitting includes:

first and second sources generating first and second signals having different frequencies F1 and F2 respectively, one of said first and second signals carrying said information to be transmitted and the other providing a frequency translation signal for said means for receiving, said first and second sources together including an oscillator having an output supplying, in operation, a signal of frequency $F0 = \frac{1}{2}(F1+F2)$, a 0, $\pi$ modulator having a first input and second input and an output, said first input of said 0,$\pi$ modulator being connected to said output of said oscillator, a modulating device having an input and an output, said output of said modulating device being connected to said second input of said 0,$\pi$ modulator, an oscillator having an output supplying, in operation, a signal of frequency F2−F1/2, said output of said oscillator supplying, in operation, said signal of frequency F2−F1/2 being connected to said input of said modulating device, and a transmitting antenna which is connected to said output of said 0,$\pi$ modulator and which supplies in operation the signals of frequencies F1 and F2 and wherein said means for receiving includes signal mix means for mixing said first and second signals to produce a third signal modulated with said information and having a frequency F3 and equal to the difference between F1 and F2; and a circuit for processing said signal of frequency F3 coupled to said signal mix means.

8. A system for the transmission and reception of information comprising:

means for transmitting said information including:
a first signal source having a first frequency $F_1$, and
a second signal source having a second frequency $F_2$, at least one of the signals from said first and second sources for being modulated by said information to be transmitted, and at least one of said signals from said first and second sources for providing a Doppler reference signal, said first and second signals forming a transmission signal; wherein said first and second signal sources together comprise: a first oscillator generating a signal having a frequency equal to $F_2-F_1$, a second oscillator generating a signal having frequency $F_1$, a modulator coupled to said first oscillator for modulating said first oscillator signal with said information, a phase locked loop coupled to said modulator and coupled to said second oscillator for producing a phase locked loop signal having said second frequency $F_2$, modulated by said information, and a summer for combining said signal having frequency $F_1$ from said second oscillator with said phase locked loop signal having frequency $F_2$ to form said transmission signal; and means for receiving said information including:
signal mixing means for receiving said transmitted signals and for generating a mix signal having a third frequency $F_3$ equal to the difference between said first frequency $F_1$ and said second frequency $F_2$, said third frequency $F_3$ modulated by said information; and
means for demodulating said mix signal whereby said information is retrieved.

9. A system accroding to claim 8 wherein said phase locked loop comprises:
a phase detector having first and second inputs, said first input for coupling to said modulator,
a voltage controlled oscillator having a control input and an output, said control input coupled to the output of said phase detector, the output of said voltage controlled oscillator being the output of said phase locked loop, and
a mixer having first and second inputs, said first input coupled to the output of said voltage controlled oscillator and said second input coupled to the output of said second oscillator, the output of said mixer coupled to said second input of said phase detector, the output of said phase locked loop being the output of said voltage controlled oscillator.

10. A system according to claim 9 further including an amplifier coupling said mixer to said phase detector and an amplifier coupling said phase detector to said control input of said voltage controlled oscillator.

11. A system according to claim 8 wherein said signal mixing means comprises a microwave diode.

12. A system according to claim 8 wherein said means for receiving further includes a receiving antenna element and wherein said signal mixing means is a microwave diode coupled to said receiving antenna element, said microwave diode producing said third frequency $F_3$.

13. A system for the transmission and reception of information comprising:

means for transmitting said information including:
a first signal source having a first frequency $F_1$,
a second signal sourse having a second frequency $F_2$, at least one of the signals from said first and second sources for being modulated by said information to be transmitted, and at least one of said signals from said first and second sources for providing a Doppler reference signal, said first and second signals forming a transmission signal wherein said first and second sources in said means for transmitting together comprise:
a first oscillator generating a signal having a frequency defined to be $F_0 = \frac{1}{2}(F2+F1)$,
$0,\pi$ modulator having a signal input coupled to said first oscillator and having a modulation input,
a second oscillator generating a signal having a frequency defined to be $F2-F1/2$, and
a modulator having a signal input coupled to said second oscillator and having an information input for coupling to said information, and having an output coupled to said modulation input of said $0,\pi$ modulator, whereby the output of said $0,\pi$ modulator is said transmission signal including signal frequencies $F_1$ and $F_2$, and means for receiving said information including:
signal mixing means for receiving said transmitted signals and for generating a mix signal having a third frequency $F_3$ equal to the difference between said first frequency $F_1$ and said second frequency $F_2$, said third frequency $F_3$ modulated by said information, and
means for demodulating said mix signal whereby said information is retrieved.

14. A system for the transmission and reception of information comprising:

means for transmitting said information including:
a first signal source having a first frequency $F_1$,
a second signal source having a second frequency $F_2$, at least one of the signals from said first and second sources for being modulated by said information to be transmitted, and at least one of said signals from said first and second sources for providing a Doppler reference signal, said first and second signals forming a transmission signal;

means for receiving said information including:
signal mixing means for receiving said transmitted signals and for generating a mix signal having a third frequency $F_3$ equal to the difference between said first frequency $F_1$ and said second frequency $F_2$, said third frequency $F_3$ modulated by said information,
means for demodulating said mix signal whereby said information is retrieved, and
an antenna comprising a dense cylindrical metal body having an orifice therein, a slab of dielectric material disposed on said body, and a conductive sheet disposed in an exposed surface of said slab of dielectric material, and wherein said signal mixing means comprising a microwave diode housed within said orifice, said diode coupled through a high frequency transistor to said conductive plate.

15. A system according to claim 14 further including means for biasing said microwave diode through said conductive sheet.

16. A system according to claim 15 wherein said means for biassing includes coupling a source of biassing voltage to said conductive sheet through said dielectric material at a point on said conductive sheet where the radio electric field due to said transmitted signal is substantially zero.

* * * * *